United States Patent [19]

Xu

[11] Patent Number: 4,820,678
[45] Date of Patent: Apr. 11, 1989

[54] METHOD FOR PREPARING RARE EARTH METAL CATALYSTS WITH HONEYCOMB-LIKE ALLOY SUPPORTS AND CATALYSTS OBTAINED THEREBY

[75] Inventor: Jinghang Xu, Beijing, China

[73] Assignees: Beijing Polytechnic University; China National Petroleum & Chemical Equipment Engineering, both of Beijing, China

[21] Appl. No.: 78,468

[22] Filed: Jul. 27, 1987

[30] Foreign Application Priority Data

Jul. 30, 1986 [CN] China ............................ 86105768

[51] Int. Cl.$^4$ .................. B01J 21/04; B01J 23/10; B01J 35/04
[52] U.S. Cl. .................... 502/303; 502/524; 502/525; 502/527
[58] Field of Search ................ 502/303, 524, 525, 527

[56] References Cited

U.S. PATENT DOCUMENTS

| | | | |
|---|---|---|---|
| 3,905,918 | 9/1975 | Mai et al. | 502/525 X |
| 4,049,583 | 9/1977 | Lauder | 502/303 |
| 4,089,810 | 5/1978 | Diwell et al. | 502/524 X |
| 4,274,981 | 6/1981 | Suzuki et al. | 502/524 X |
| 4,397,770 | 8/1983 | Cairns et al. | 502/316 |
| 4,485,191 | 11/1984 | Sekido et al. | 502/525 X |

FOREIGN PATENT DOCUMENTS 55-70348  5/1980  Japan ................................. 502/527

OTHER PUBLICATIONS

Pratt et al., "Noble Metal Catalysts on Metallic Substrates", Platinum Metals Rev., 21(3), pp. 74–83 (1977).

Primary Examiner—W. J. Shine
Attorney, Agent, or Firm—Morgan & Finnegan

[57] ABSTRACT

This invention relates to a method for preparing rare earth metal catalysts with a honeycomb-like alloy support and catalysts obtained thereby, which method comprises: preparing a corrugated, perforated metal alloy support tape, coating the support tape with a solution of a mixture of light rare earth metal salts; drying the support tapes; decomposing and oxidizing the rare earth metal salts into catalytic materials having a perovskite or a spinel type crystal structure.

24 Claims, 4 Drawing Sheets

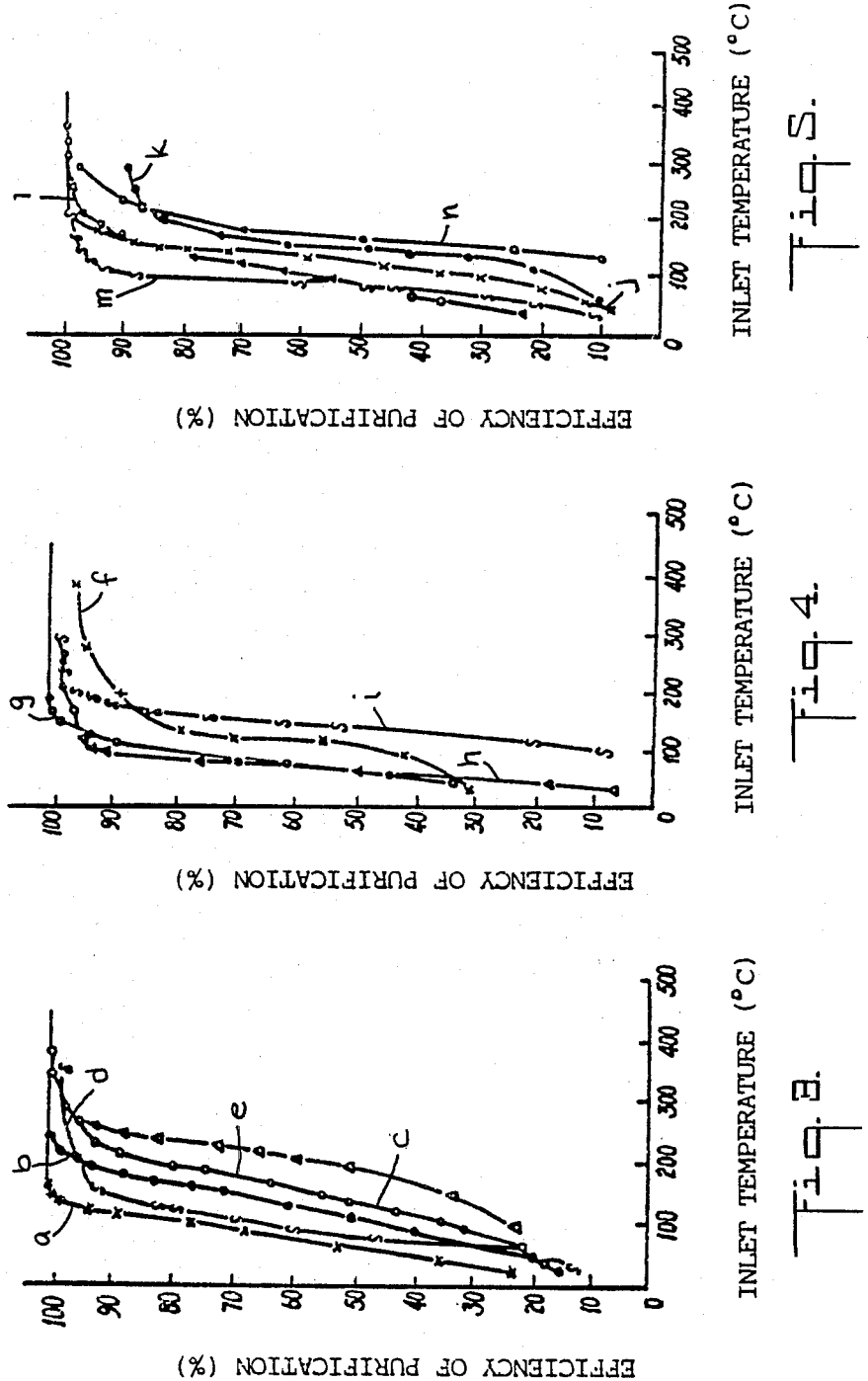

METHOD FOR PREPARING RARE EARTH METAL CATALYSTS WITH HONEYCOMB-LIKE ALLOY SUPPORTS AND CATALYSTS OBTAINED THEREBY

FIELD OF THE INVENTION

This invention relates to a method for preparing rare earth metal catalysts with a honeycomb-like alloy support and catalysts obtained thereby. More particularly, this invention relates to a fast coating and drying method for preparing rare earth metal catalysts with a honeycomb-like alloy support and catalysts obtained thereby. The resulting catalysts are suitable for use in the purification of industrial waste gases, exhaust gases from automobiles as well as in purification of air.

BACKGROUND OF THE INVENTION

Much effort has been expended in recent years in impoving the performance of catalysts, reducing their cost and extending their useful life.

In a known method for preparing the catalysts, ceramic materials or high temperature-resisting aluminum-containing alloy materials, which generally include silica, ceramic compositions, natural silicious materials, alundum, silicon carbide, titania and zirconia etc., are used as catalyst supports with noble metals being used as the catalytic materials. However because noble metals are rare and expensive, the cost of the resulting catalysts are also expensive. Presently known rare earth metal catalysts are generally formed by impregnating the ceramic support structure with a solution of a mixture of rare earth metal salts, then drying and calcining the impregnated supports. In this method, the catalytic materials are not coated firmly and uniformly onto the supports in strict stoichiometric proportions, therefore, one can not obtain a predetermined level of catalytic activity. Other known methods for coating a catalytic materials onto supports comprise co-deposition, chemical plating, spray drying, metallurgical consolidation, freeze drying, and the like. However, all these methods are unsatisfactory because the catalytic activity can not be predetermined and the catalysts produced have a short useful life.

SUMMARY OF THE INVENTION

Thus, an object of the present invention is to provide a method for preparing rare earth metal catalysts with a honeycomb-like alloy support capable of overcoming the afore-mentioned drawbacks of the prior art.

Another object of the present invention is to provide a new method for coating a catalytic materials onto the support firmly and uniformly in stoichiometric proportions forming desired chemical structures.

A further object of the present invention is to provide rare earth metal catalysts with a honeycomb-like alloy support prepared by the method according to the present invention, which catalysts have the advantages of high catalytic activity, good thermal stability, lower cost and a long useful life.

The present invention provides a method for preparing rare earth metal catalysts with a honeycomb-like alloy support comprising the following steps: (1) preparing an alloy support tape; (2) rapidly coating the surfaces of the support with a solution of a mixture of rare earth metal salts; (3) heating the coated support tape to dry and to decompose the rare earth metal salts; (4) oxidizing the rare earth metals into composite oxides having desired chemical structures; and (5) forming the support tape coated with catalytic materials into desired shapes and sizes. Alternatively, step (5) may be carried out prior to step (4).

The support used in the present invention is a Fe-Cr-Al alloy or Ni-Cr-Al alloy tape with high thermal stability and electrical resistance. The catalytic materials used in the present invention are rare earth metal composite oxides having perovskite-type crystal structure ($ABO_3$) or spinel-type crystal structures ($A_2BO_4$) comprising mixed light rare earth metals and iron. The catalysts prepared by the method according to this invention have high catalytic activity, high thermal stability, high resistance to lead poisoning and a long useful life.

BRIEF DESCRIPTION OF THE DRAWINGS

In FIG. 1, the numbered parts are indicated herebelow:

| | |
|---|---|
| (1) two-roller mill | (2) four-roller mill |
| (3) perforator | (4) crimping machine |
| (5) shaft | (6) degreasing tank |
| (7) degreasing agent | (8) water washing tank |
| (9) acid etching tank | (10) water washing tank |
| (11) ultra-sonic cleaner | (12) deionized water |
| (13) activating kiln | |

Figure 2:
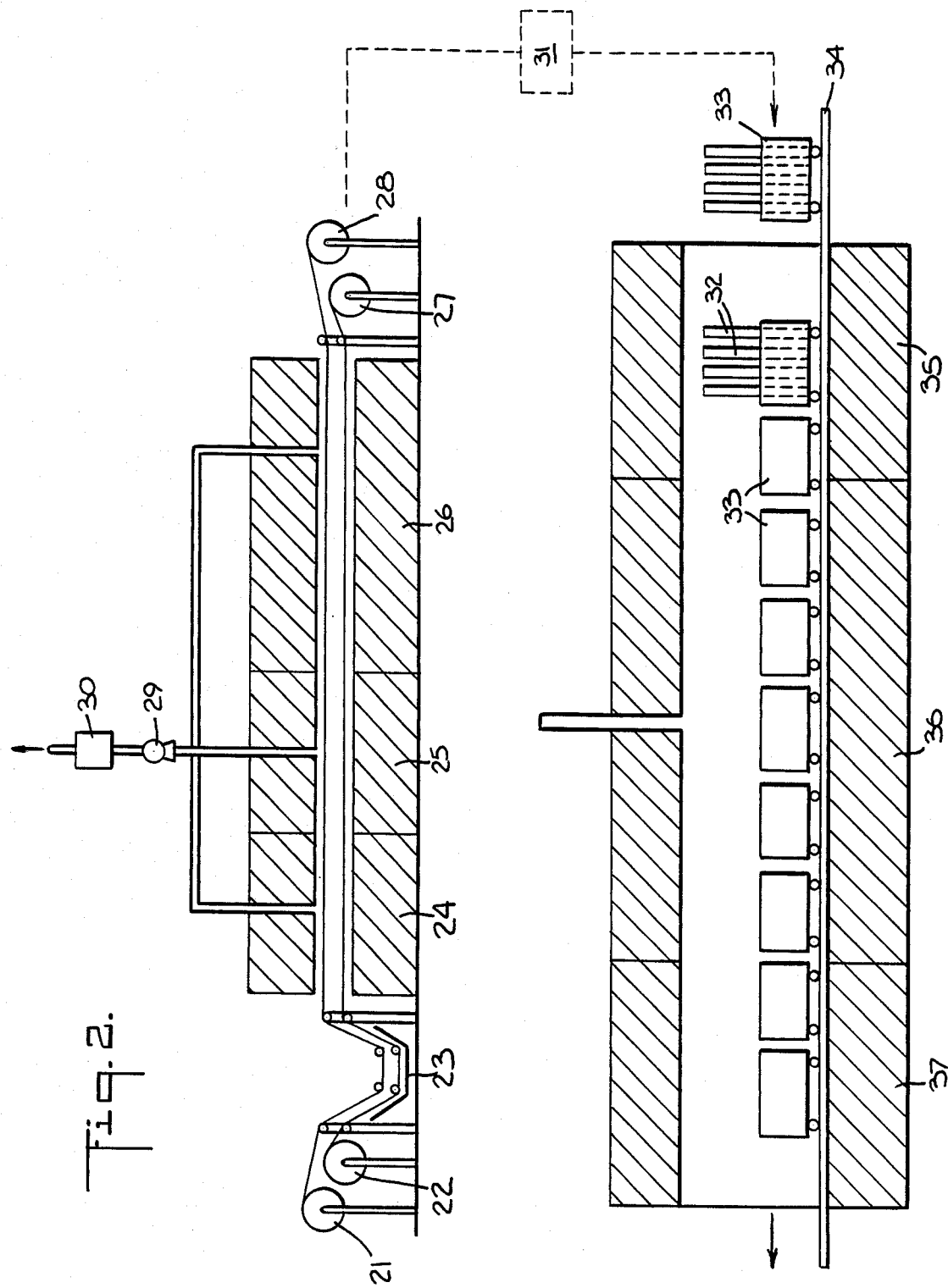
Figure 6:
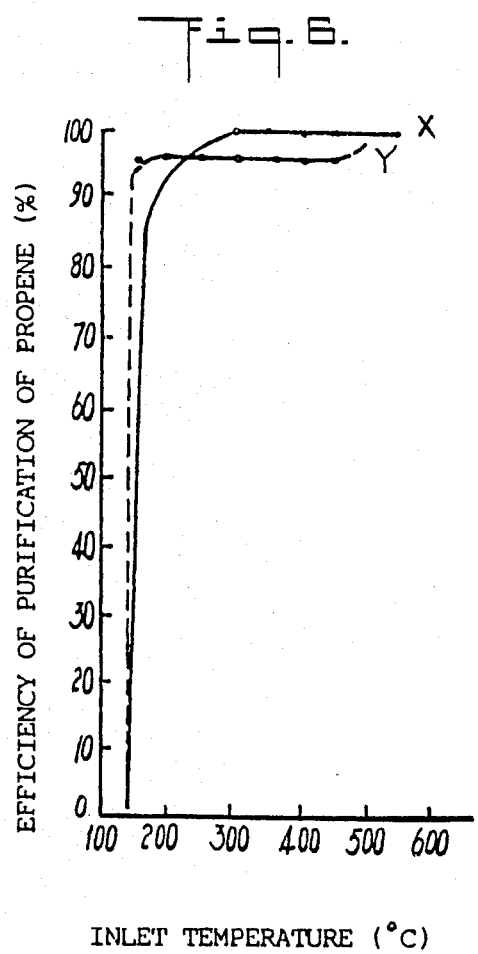

FIG. 2 is a schematic process diagram for preparing the catalysts of the present invention. In FIG. 2, the numbered parts are indicated below:

(21), (22), (27), (28), shafts for supporting and moving tape;
(23) fast coating tank;
(24) drying section of the coating kiln;
(25) salts decomposing section of the coating kiln;
(26) primary oxidizing section of the coating kiln;
(29) fan;
(30) $NO_x$ purifier;
(31) shaping section;
(32) shaped catalyst blocks;
(33) carriage;
(34) rail;
(35) preheating section;
(36) secondary oxidizing section;
(37) cooling section;

FIGS. 3, 4 and 5 are graphs showing percent of purification of organic waste gases using the catalysts ($ABO_3$ crystal-type) of the present invention. In FIGS. 3, 4 and 5, the experimental conditions were: Space velocity: 10000 $h^{-1}$;

Organic compounds and their initial concentrations:
a. n-hexane: 9065 ppm
b. isoctane: 8565 ppm
c. cyclohexene: 5279 ppm
d. glacial acetic acid: 5232 ppm
e. formaldehyde: 5000 ppm
f. cyclohexanone: 6855 ppm
g. ethanol: 5476 ppm
h. n-butanol: 10000 ppm
i. ethyl acetate: 4870 ppm
j. benzene: 10000 ppm
k. cresol: 6807 ppm
l. pyridine: 600 ppm
m. acetonitrile: 6011 ppm
n. carbon monoxide: 9300 ppm FIG. 6 is a graph comparing the catalytic activity of the catalyst (ABO$_3$ crystal-type) of the present invention with a known catalyst with 0.5 percent by weight of palladium. In FIG. 6, X is an ABO$_3$-type catalyst of the present invention; Y is a known catalyst with 0.5 % by weight of palladium. The concentration of propene in the waste gas was 10000 ppm and the space velocity was 10000 h$^{-1}$.

Figure 7:
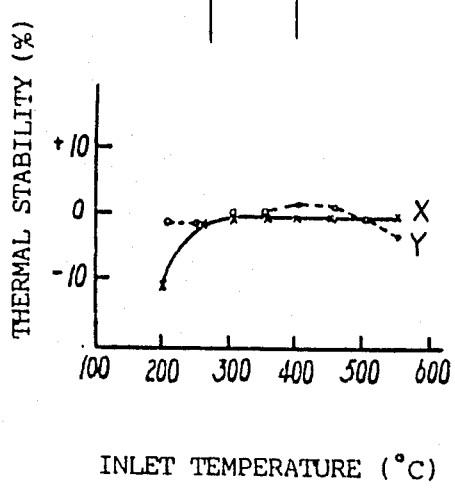

FIG. 7 is a graph comparing the thermal stability of the catalyst (ABO$_3$ crystal-type) of the present invention with a catalyst with 0.5 percent by weight of palladium. In FIG. 7, X is an ABO$_3$-type catalyst of the present invention; Y is a catalyst with 0.5% by weight of palladium. Thermal stability herein means the change in efficiency of purification of propene after the catalyst was exposed to a gas flow at 800° C. for 2 hours. The concentration of propene in the waste gas was 10000 ppm and the space velocity was 10000 h$^{-1}$.

$$\Delta \eta_{thermal\ stability} = \eta_{before\ exposure} - \eta_{after\ exposure}$$

Figure 8:
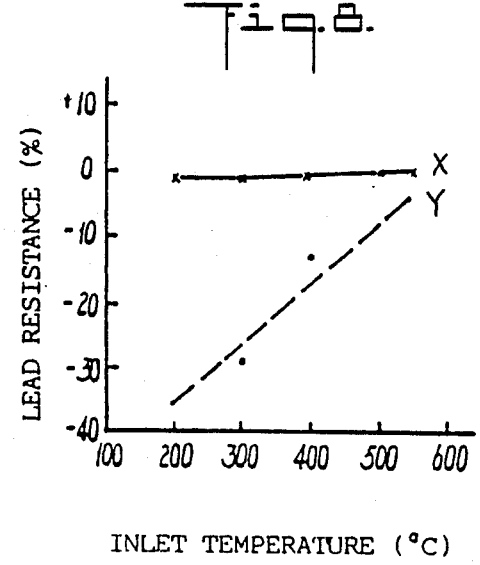

FIG. 8 is a graph comparing resistance to lead poisoning of the catalyst (ABO$_3$ crystal-type) of the present invention with a known catalyst with 0.5 percent by weight of palladium. In FIG. 8, X is an ABO$_3$-type catalyst of the present invention; Y is a catalyst with 0.5% by weight of palladium. Resistance to lead poisoning means the change in efficiency of purification, $\eta$, of propene after the catalyst was poisoned by lead.

The concentration of propene in the waste gas was 10000 ppm and the space velocity was 10000 h$^{-1}$.

$$\Delta \eta Pb\ resistance = \eta_{before\ Pb\ poisoning} - \eta_{after\ Pb\ poisoning}$$

Figure 9:
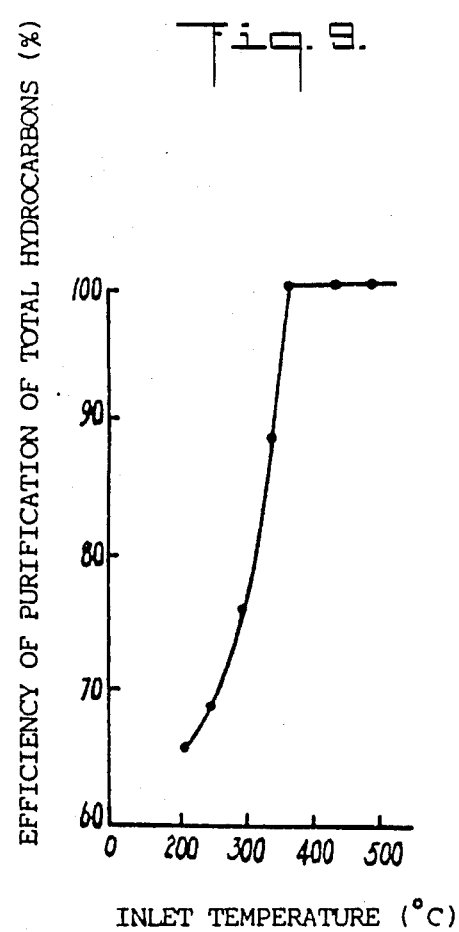

FIG. 9 is a graph showing the efficiency of purification of total hydrocarbon (HC$_T$) of air contained in a steel bottle. In FIG. 9, the concentration of HC$_T$ in air contained in steel bottle was 57 ppm and the space velocity was 3500 h$^{-1}$.

DETAILED DESCRIPTION OF THE INVENTION AND THE PREFERRED EMBODIMENTS

Figure 1:
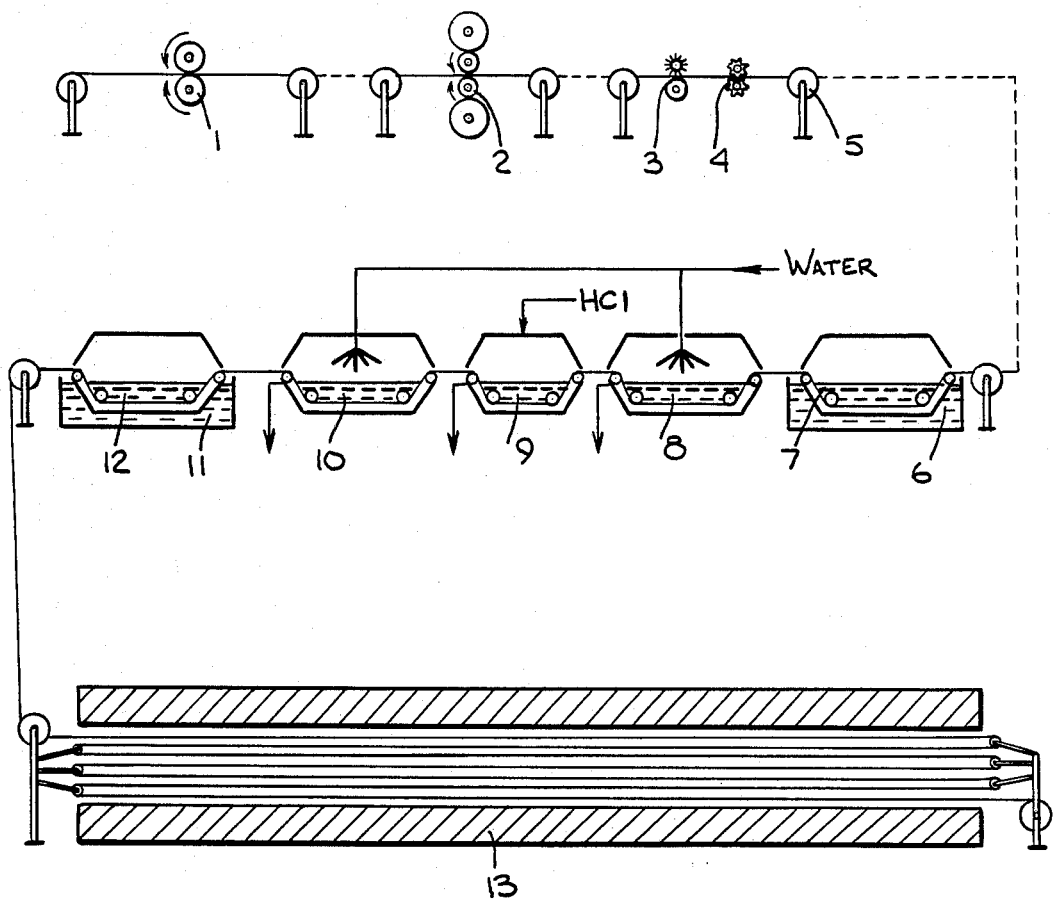
FIG. 1 is a schematic process diagram for preparing the honeycomb-like alloy support tape of the present invention.

The support of the present invention is made of activated tapes prepared from Fe-Cr-Al alloy or Ni-Cr-Al alloy strips with high thermal stability and electrical resistance. The activated tapes are prepared as shown in FIG. 1. The alloy strips are rolled into long tapes with a thickness of about 0.5-0.12 mm, preferably about 0.07-0.08 mm, and a desired width of from about 25 mm to 50 mm. The resulting long tapes are perforated intermittently, preferably at distances of about 1.1 mm to 1.2 mm apart, from both the top and bottom surfaces to form small holes of preferably about 0.4 mm × 0.4 mm with metal burrs. The penetration of the small holes should be more than or equal to 90%. The tapes may then be crimped into corrugated tapes with a wavy structure having a wave height of preferably about 1.0-2.0 mm with a distance of preferably about 2-3 mm between adjacent waves. The tapes are then subjected to degreasing, acid etching, roughening and heat activating treatments, to form a protective layer of $\gamma$-Al$_2$O$_3$ on their surfaces.

In comparison with the metal supports in the prior art, the supports of the present invention have small holes with metal burrs. This latter feature provides increased absorbance and higher specific surface area to the supports of the present invention. Moreover, during heat treatment, metal bonds can be formed between the surfaces of the supports and the catalytic materials, to firmly bond the catalytic materials onto the surfaces of the supports.

In addition, the high thermal stability and electrical resistance of the supports used in the present invention permit the catalysts to be electrically activated by applying a voltage to the support. After activation, the surfaces of the supports rapidly reach a temperature sufficient to initiate the catalytic reaction. Thus, the waste gas preheaters necessary to a prior art catalytic apparatus can be eliminated and the cost of the catalytic purifying apparatus of the present invention is reduced.

The catalytic materials sutiable for use in the present invention are rare earth metal composite oxides having perosvkite-crystal structures (ABO$_3$) or spinel-type crystal structures (A$_2$BO$_4$). Generally, in the composite oxides of either crystal structures. A types cations are metals of atomic number 11-16, 56-71 or 89-103, and B type cations are metals of variable valence having ionic radii between about 0.4 angstroms and 1.4 angstroms. In ABO$_3$ type structures, the total A type metal cations should be equal to the total of B type metal ions of variable valence. In A$_2$BO$_4$ structures, the total A type cations should be equal to twice the total of B type cations. In both types of structures, the total of charges of A type and B type cations should be equal to the total of the charges of the oxygen ions.

In the composite oxides having ABO$_3$ structures according to the present invention, of the sites of A, from about 60% to 80% are occupied by cations of mixed light rare earth metals or lanthanum, and from about 40% to 20% are occupied by cations of an alkaline earth metal selected from the group consistng of strontium, calcium and mixtures thereof; of the sites of B, from about 50% to 80% are occupied by cations of iron, and from about 50% to 20% are occupied by cations of a metal selected from the group consisting of manganese, copper, nickel, and mixtures thereof. When a lower initial temperature for the catalytic reaction is desired, a small amount of palladium may be added, i.e. about 1% of the sites of B may be occupied by palladium.

In the composite oxides having A$_2$BO$_4$ structures according to the present invention, of the sites of A, from about 70% to 90% are occupied by cations of mixed light rare earth metals or lanthanum, and from about 30% to 10% by cations of an alkaline earth metal selected from the group consisting of strontium, calcium, and mixtures thereof; and of the sites of B, from about 50% to 80% are occupied by cations of iron, and from about 50% to 20% are occupied by cations of nickel.

The catalytic materials useful in the present invention can be formulated as follows:

$[RE_{(1-x)}Sr_x][Fe_{(1-y)}Mn_y]O_3$, or $[La_{(1-x)}Sr_x][Fe_{1-y-w}Mn_yPd_w]O_3$ $[RE_{(2-a-b)}Sr_aCa_b][Fe_{(1-z)}Ni_z]O_4$ or $[La_{2-a-b}Sr_aCa_b][Fe_{(1-z)}Ni_z]O_4$

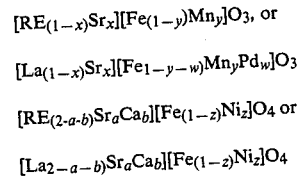

... ..., ...—0.2–0.5. The values indicated hereinabove are approximate values and RE indicate that it is a rare earth element or a mixture of rare earth elements.

In the present invention, the composite oxides of rare earth metals useful as catalytic materials are relatively loosely packed, and the surfaces of the supports have many small holes. Thus, the catalysts of the present invention behave like porous sound absorbing materials. The sound waves cause the air in the voids of the materials to vibrate and there is friction of the air with the walls in the voids. As a result, sound energy is converted into thermal energy and noise is reduced. When several blocks of catalysts are placed in spaced intervals, the gas flow therethrough suddenly deffuses as it passes from one catalyst block to another. Thus, in accordance with the principle of millipore amplified erasure the catalysts of the present invention also functions to reduce or eliminate noise, and can be used as a muffler.

The method for preparing a catalyst of the present invention is described here below more specifically with reference to the accompanying drawings.

The catalysts according to this invention can be prepared in a continuous manner by the use of the apparatus shown in FIG. 2. First, two differently shaped tapes, such as a corrugated support tape, and a flat support tape are rolled up respectively on shaft (21) and shaft (22) and fed simultaneously at a fixed speed in the range of 1 to 2 m/min. The tapes are passed through a tank containing a solution of a mixture of rare earth metal salts and is coated uniformly. The speed at which the support tapes are fed through the coating tank (23) is such that the support tapes are in the coating tank for a period of about 0.5–30 sec. If the first coating is not sufficiently thick or uniform, the support tapes may be re-coated. Thereafter, the coated support tapes are immediately fed into a drying section (24) of the coating kiln set at a temperature in the range of about 110° C. to 200° C. The interval between the coating step and drying step is not more than 120 sec. The tapes are then fed into a salt decomposing section (25) at a temperature set in the range of about 350° C. to 450° C. and subsequently into a primary oxidizing section (26). In the primary oxidizing section (26), catalytic materials, which are to be converted to an $ABO_3$-type crystal structure, are oxidized at a temperature of from about 650° C. to 750° C.; whereas, catalytic materials which are to be converted to an $A_2BO_4$ type crystal structure are oxidized at a temperature from about 800° C. to 850° C. Thereafter, the support tapes coated with catalytic materials are rolled up on shaft (27) and shaft (28) respectively, or the tapes may be rolled up together on one shaft, (27) or (28). The resulting support tapes coated with catalytic materials can be formed into catalysts with desired shapes and sizes, such as cylinders or blocks. The shaped catalysts (32) are then discharged into a carriage (33) and passed through a preheating section (35) in a period of about 30 min. at a temperature in the range of about 350° C. to 450° C., then through a secondary oxidizing section (36) in a period of about 90 min. at the same temperature range as the primary oxidizing section (26) and subsequently through a cooling section (37) in a period of about 30 min. Alternatively, after the salts are decomposed, the support tapes loaded with catalytic materials may be passed through a long oxidizing section in a period of about 60 min., cooled, and then form into shaped catalysts as desired.

The catalysts prepared by the above-said method according to this invention have high catalytic activity, a long catalytic life and are low in cost to manufacture.

The following examples illustrate the invention and are not to be construed as limiting the scope thereof.

EXAMPLE 1.

Preparation of Activated Support Tapes

As shown in FIG. 1, a Fe-Cr-Al alloy ($OCr_{21}Al_6$) strip *with a thickness of* 1.0 mm is rolled several times with a two-roller mill (1) and a four-roller mill (2) to attain a thickness of about 0.07–0.08 mm. The composition of the Fe-Cr-Al alloy is as follows (by weight based on the total weight of the alloy): Cr:21–24%, Al:6.5–7.5%, rare earth metals: 0.03%, Ti:0.15%, Co:0.5%, C less than or equal to 0.06%, Si less than or equal to 0.06%, Mn less than or equal to 0.06%, S less than or equal to 0.03%, P less than or equal to 0.03%, with the balance being Fe.

The Fe-Cr-Al alloy has the following characteristics: a maximum operating temperature of up to 1200° C., a coefficient of elongation of greater than or equal to 12%, a cold bend for 90% of greater than or equal to 5 bendings, a specific electrical resistance of $1.4\pm0.1\Omega mm^2/M$, and an annealing temperature of about 800°±20° C.

The resulting metal tape is perforated at intervals of about 1.2 mm with a perforator (3) to contain small holes having metal burrs on both surfaces. The size of the holes is about $0.4 \times 0.4$ mm, and the penetration of the holes is greater than or equal to 90%. Part of the resulting tape is then rolled by a crimping machine (4) to form a corrugated tape with a wavy structure having a wave distance between adjacent waves of about 3 mm, and a wave height of about 1.1–1.7 mm.

Thereafter, the resulting alloy tape is subjected to the following treatments to form an oxide layer on the surfaces. The treatments include (a) degreasing with a degreasing agent (7) in degreasing tank (6) at 50° C., (b) washing with water in tank (8), (c) acid etching in tank (9) with 38% industrial hydrochloric acid for about 5–8 min., (d) water washing in tank (10), (e) cleaning with deionized water (12) in an ultra-sonic cleaner (11), and (f) activating in a kiln (13) at a temperature in the range of 650°–750° C. The abovementioned treatments are carried out continuously.

EXAMPLE 2.

Preparation of Catalysts 234.8 grams of lanthanum nitrate, 63.49 grams of strontium nitrate, 318,93 grams of iron nitrate, 35.79 grams of manganese nitrate and 2.30 grams of palladium nitrate are dissolved in water and mixed homogeneously to form 2000 ml of solution. The solution was charged into tank (23) of the coating apparatus as shown in FIG. 2. The drying section of the fast coating kiln was controlled at a temperature in the range of about 150° C., the salts decomposing section of the fast coating kiln was controlled at a temperature in the range of about 400° C., and the primary oxidizing section was controlled at a temperature in the range of about 700° C.

Two activated support tapes, one being corrugated and one being flat, prepared according to Example 1 were simultaneously fed out of shafts (21) and shaft (22) respectively, and passed through the fast coating apparatus at a fixed speed in the range of about 1.5 m/min., resulting in a coating time of about 0.5 sec. The coated support tapes were then passed through the drying section, the salt decomposing section and the primary oxidizing section. Afterwards, the resulting support tapes having two different shapes were rolled on one shaft, (27) or (28), to form catalysts with cylindrical shapes. The cylindrical shaped catalysts were discharged into carriage (33), and then passed through the oxidizing kiln at a temperature in the range of about 700° C. for about 1.5 hours. About 4-5 kg of the catalyst with the following stoichiometry, $[La_{0.7}Sr_{0.3}][Fe_{0.79}Mn_{0.2}Pd_{0.01}]O_3$, as the catalytic material was obtained. The catalytic material was about 7-8 percent by weight of the catalyst.

The suitability and efficiency of purification of this catalyst are shown in FIGS. 3, 4 and 5. The graphs comparing this catalyst with a noble metal palladium catalyst as the catalytic material (with the same support) are shown in FIGS. 6, 7 and 8. The performance of this catalyst in purifying air contained in a steel bottle is shown in FIG. 9. The space velocity character and acoustic absorption coefficient are shown in Tables 1 and 2.

TABLE 1

Propylene Purifying Efficiency (%) And Space Velocity

| waste gas space velocity ($h^{-1}$) | catalyst of the present invention | | | | catalyst with 0.1% by weight of Pd | | | |
|---|---|---|---|---|---|---|---|---|
| | inlet temperature (°C.) | | | | | | | |
| | 200 | 300 | 400 | 500 | 200 | 300 | 400 | 500 |
| 40000 | 9.7 | 87.5 | 82.4 | 87.2 | 21.5 | 56.6 | 72.0 | 79.2 |
| 30000 | 22.9 | 93.3 | 92.9 | 91.2 | 38.0 | 54.7 | 79.7 | 89.4 |
| 20000 | 58.2 | 100 | 92.9 | 97.9 | 54.0 | 54.0 | 87.5 | 93.3 |
| 10000 | 66.7 | 100 | 99.4 | 100 | 70.0 | 73.6 | 100 | 100 |
| 5000 | 64.0 | 100 | 100 | 100 | 78.5 | 90.7 | 100 | 100 |

Note:
The waste gas contains 1% by weight of $C_3H_6$ and 0.2% by weight of CO.

TABLE 2

Coefficient of Acoustic Absorption of Catalysts

| shape | wave height (mm) | air thickness (mm) | acoustic frequency (HZ) | | | | | | |
|---|---|---|---|---|---|---|---|---|---|
| | | | 125 | 250 | 500 | 100 | 1800 | 2000 | 4000 |
| φ 98 mm, thickness 0.07 mm thick, corrugated sheet | 1.7 | — | 0.09 | 0.07 | 0.09 | 0.09 | — | 0.34 | 0.55 |
| φ 98 mm × 50 mm catalyst having honeycomb shape | 1.1 | 2.1 | 0.09 | 0.12 | 0.21 | 0.42 | 0.44 | | |
| | 2.0 | 1.5 | 0.09 | 0.18 | 0.25 | 0.48 | 0.54 | | |
| | 2.3 | 0.7 | 0.10 | 0.13 | 0.21 | 0.43 | 0.53 | | |

EXAMPLE 3.

98.0 grams of mixed light rare earth metals was dissolved in 100 ml of nitric acid to form a solution. 84.65 grams of strontium nitrate, 238.7 grams of iron nitrate, 35.79 grams of manganese nitrate and 37.51 grams of copper nitrate were dissolved in water to form a solution. Thereafter, the above two solutions are mixed together to form 2000 ml of a mixed solution. The resulting mixed solution is charged into the coating tank (23) of the fast coating apparatus. 4 kg of catalyst with the stoichiometric formula $[RE_{0.6}Sr_{0.4}][Fe_{0.6}Mn_{0.2}Cu_{0.2}O_3$ as catalytic material was obtained by using the method as described in Example 2.

The catalyst as prepared above was used to purify automobile waste gases and showed noise suppression effects. By experiment, this catalyst was shown to have a useful life exceeding a vehicle travelling distance of 58,000 km. The comparison data between an automobile waste gas purifier (HF-type) using the catalyst of the present invention and an ordinary muffler are shown in Tables 3 and 4.

TABLE 3

Results of Plateform Test In A BJ-492 Engine*

| | | Engine Speed (km/hr) | | | | | | | |
|---|---|---|---|---|---|---|---|---|---|
| | | idle | 20 | 30 | 40 | 50 | 60 | 70 | average |
| effective power (hp) | engine + hollow pipe | — | 4.12 | 6.77 | 10.41 | 15.21 | 20.8 | 28.78 | 14.36 |
| | engine + muffler | — | 4.14 | 6.76 | 10.42 | 15.08 | 21.08 | 28.50 | 14.33 |
| | engine + purifier | 0.30 | 4.08 | 6.79 | 10.38 | 14.87 | 21.54 | 28.47 | 14.35 |
| gas flow resistance (mmH2O) | muffler | 12.0 | 17.5 | 21.5 | 33.52 | 68.0 | 104.0 | 186.0 | 63.2 |
| | purifier | 25 | 4.0 | 10.5 | 14.5 | 32.5 | 63.0 | 110.0 | 33.9 |
| specific fuel consumption (g/hp.hr) | engine + hollow pipe | — | 436 | 368 | 314 | 288 | 278 | 287 | 328 |
| | engine + muffler | — | 433 | 376 | 316 | 286 | 278 | 284 | 329 |
| | engine + purifier | 3866 | 428 | 370 | 309 | 295 | 278 | 284 | 327 |
| concentration of CO in exhaust (%) | front of purifier | 5.05 | 3.5 | 4.3 | 1.7 | 1.7 | 2.4 | 2.3 | 3.0 |
| | back of purifier | 0.47 | 0.05 | 1.8 | 0.05 | 0.5 | 1.1 | 1.8 | 0.8 |
| concentration of HC in exhaust (ppm) | front of purifier | 6850 | 1100 | 350 | 205 | 200 | 180 | 200 | 1298 |
| | back of purifier | 1160 | 0 | 150 | 50 | 100 | 100 | 100 | 237 |
| concentration of $NO_x$ in exhaust (mg/m³) | front of purifier | 47.2 | 431 | 119 | 88 | 117 | 115 | 85 | 143 |
| | back of purifier | 6.6 | 168 | 95 | 40 | 93 | 69 | 96 | 81 |
| noise dB(A) | engine + hollow pipe | 113 | 114 | 117 | 123 | 126 | 131 | 136 | 123 |
| | engine + muffler | 66 | 70 | 72 | 78 | 82 | 88 | 89 | 78 |
| | engine + purifier | 62 | 65 | 68 | 70 | 74 | 80 | 82 | 76 |

*HF-Type of purifier contains 1.7 l of catalyst having $ABO_3$-type, fuel is a lead containing gasoline.

TABLE 4

Comparison of Automobile Waste Gas Purifier (HF-Type) (N) using the catalyst of the present invention and origional muffler (M)

| Auto mobiles | Purifier | Purification of CO at idle speed | | Purification of HC at idle speed | | Noise level dB(A) M/N | Times to accelerate engine in sec | | Fuel consumption | |
|---|---|---|---|---|---|---|---|---|---|---|
| | | concentration (%) M/N | efficiency of purification (%) | concentration (ppm) M/N | efficiency of purification (%) | | 25/60 (km/hr) M/N | 15/40 (km/hr) M/N | fuel consumption 1/100 km M/N | reduction of fuel consumption (%) |
| BJ-130 (light truck) | HF-1 | 6.8/0.9 | 86.8 | 1626/100 | 93.8 | 81.3/79.4 | 20.9/19.7 | 28.4/28.3 | — | — |
| BJ-212 (Jeep) | HF-1 | 2.4/0.28 | 90.4 | 2000/145 | 92.8 | 79.3/80.0 | 13.1/11.6 | 12.2/16.1 | 10.3/9.55 | 7.3 |
| TJSF travelling car | HF-1 | 6.2/0.13 | 97.9 | 1000/ | 86.2 | 76.7/76.2 | 23.3/23.1 | 28.4/28.6 | — | — |
| WU HAN 121 (Jeep) | HF-1 | 5.94/0.02 | 99.0 | 4000/115 | 97.1 | 79.8/77.3 | 17.1/17.1 | 21.1/20.4 | 13.3/12.1 | 9.0 |
| WU HAN 121 (Jeep) | HF-2 | 5.4/1.0 | 81.5 | 2300/450 | 80.4 | 85.8/84.6 | — | — | — | — |
| Jie Fang CA-10C (truck) | HF-3 | 0.22/0.06 | 72.7 | 530/20 | 86.8 | 90.0/84.5 | 19.8/19.5 | 30.2/31.1 | — | — |
| CA-653 (sedan) | HF-4 | 4.22/0.05 | 98.7 | 1020/955 | 90.6 | 88.4/79.8 | 43.6/39.6 | 57.8/52.2 | 29.5/28.4 | 3.7 |

EXAMPLE 4.

454.90 grams of lanthanum nitrate, 63.49 grams of strontium nitrate, 49.22 grams of calcium nitrate, 242.27 grams of iron nitrate and 73.08 grams of nickel nitrate are dissolved in water to form 2500 ml of solution. The resulting solution is charged into the coating tank (23) of the coating apparatus. 5 kg of catalysts with the following stiochiometric formula $[La_{1.4}Sr_{0.3}Ca_{0.3}][Fe_{0.6}Ni_{0.4}]O_4$ as the catalytic material was obtained using the same method and conditions as described in Example 2 except that the oxidizing temperature was from 800° C. to 850° C.

When this catalyst was used in the purification of waste gas containing 100 ppm of $NO_x$, at a space velocity of 10000 $h^{-1}$ and a temperature of 300° C. After purification the gas contained less than 0.6 ppm of $NO_x$.

The above-mentioed catalysts may also be formed into various shapes and sizes as desired. The overall characteristics of the catalysts of the present invention is shown in Table 5.

TABLE 5

| characteristic | unit | Shape Of Catalyst | |
|---|---|---|---|
| | | industrial waste gases | automobile waste gases |
| external size | mm | 200 × 200 × 50, 250 × 200 × 50 | φ 120 × 25, φ 150 × 25 |
| hole surface area | mm² | 2.7 | 2.3 |
| hole wall thickness | mm | 0.05–0.12 | 0.05–0.12 |
| free section surface | % | 88–92 | 85–88 |
| specific weight | kg/l | 0.5–0.6 | 0.75–0.85 |
| parts by weight of catalytic material in the catalyst | % | 7–8 | 7–8 |

The catalysts prepared by the method according to the invention can be regenerated. Regeneration test results are shown in Table 6. The test results show that the catalysts can be regenerated by different methods according to the cause of reduction of catalytic activity. When the catalysts becomes completely inactive, the supports may be re-used.

TABLE 6

Results of Regeneration Test

| Cause of Activity Reduction | Method of Regeneration | Initial Efficiency Activity | | Activity Before Regeneration Catalysts | | After Regeneration | |
|---|---|---|---|---|---|---|---|
| | | t 50% (°C.) | t 90% (°C.) | t 50% (°C.) | t 90% (°C.) | t 50% (°C.) | t 90% (°C.) |
| dust pollution | washing with 1% of wash liquid, and then drying | 214 | 365 | 260 | 477 | 216 | 260 |
| heated at 700° C. for 2 hours | reactivating with gas flow at 450° C. for 2 hours | 190 | 420 | 342 | 590 | 190 | 410 |
| | heating in Presence of air at 500° C. for 2 hours | 290 | 393 | 370 | 560 | 370 | 560 |
| carbon deposit | heating in presence | 290 | 393 | 370 | 560 | 300 | 398 |

TABLE 6-continued

| | | Results of Regeneration Test | | | | | |
|---|---|---|---|---|---|---|---|
| | | Initial Efficiency Activity | | Activity Before Regeneration Catalysts | | After Regeneration | |
| Cause of Activity Reduction | Method of Regeneration | t 50% (°C.) | t 90% (°C.) | t 50% (°C.) | t 90% (°C.) | t 50% (°C.) | t 90% (°C.) |
| | of air at 500° C. for 24 hours heating in presence of air at 650° C. for 2 hours | 270 | 420 | 290 | 441 | 270 | 421 |
| Loss of catalytic material | wash with 1% of wash liquid, dry, and coat with catalytic material according to original composition | 224 | 350 | 432 | 605 | 216 | 350 |

I claim:

1. A method for preparing rare earth metal catalysts with a support having a honeycomb-like cross-section comprising the following steps:
   A. Preparing an activated support tape from an alloy comprising Fe-Cr-Al alloy or Ni-Cr-Al alloy by perforating, intermittently at distances of 1.1 mm to 1.2 mm apart, from both top and bottom surfaces of the tape to form small holes with metal burrs, crimping the tape to form a corrugated tape with an amplitude of 1.0 to 2.0 and a distance between wave heights of between about 2mm to 3mm and subjecting the perforated and crimped tape to degreasing, acid etching, roughening and heat activation to form a protective layer of $\gamma\text{-Al}_2\text{O}_3$ on the surface of the tape;
   B. Coating a solution of a rare earth metal salt or a mixture of rare earth metal salts onto the surfaces of the support tape;
   C. Drying the support tape;
   D. Decomposing the rare earth metal salt or mixture coated on the support tape by heating at a temperature between about 350° C. to 450° C.;
   E. Oxidizing the rare earth metal salt or mixture on the support tape into catalytic materials having chemical structures selected from the group consisting of $ABO_3$, wherein, of the sites of A, from about 60% to 80% are occupied by cations of rare earth metal or mixture and about 40% to 20% are occupied by cations of an alkaline earth metal selected from the group consisting of strontium, calcium and mixtures thereof; and, of the sites of B, from about 50% to 80% are occupied by cations of iron and from 50% to 20% are occupied by cations of metals selected from the group consisting of manganese, copper, nickel, mixtures thereof, and optionally about 1% are occupied by palladium, or $A_2BO_4$, wherein, of the sites of A, from about 70% to 90% are occupied by cations of the rare earth metal or mixture and from about 30% to 10% are occupied by cations of an alkaline earth metal selected from the group consisting of strontium, calcium and mixtures thereof, and, of the sites of B, from about 50% to 80% of cations of iron and from 50% to 20% are occupied by cations of nickel; and
   F. Forming the support tape into structures with a honeycomb-like cross-section.

2. The method of claim 1 wherein the coating step is performed within about 0.5-30 sec.

3. The method of claim 2 wherein the drying step is carried out for not more than 120 sec. after completion of the coating step.

4. The method of claim 3 wherein the drying step is carried out at a temperature in the range of about 110° C. to 200° C.

5. The method of claim 1 wherein the oxidizing step is carried out at a temperature in the range of about 650°-750° C.

6. The method of claim 5 wherein the oxidizing step is carried out for about 1.0-1.5 hours.

7. The method of claim 6 wherein the catalytic materials formed are rare earth metal composite oxides having perovskite-type crystal structures, $ABO_3$.

8. The method of claim 4 wherein the oxidizing step is carried out at a temperature in the range of about 800°-850° C.

9. The method of claim 8 wherein the oxidizing step is carried out for about 1.0-1.5 hours.

10. The method of claim 9 wherein the catalytic materials formed are rare earth metal composite oxides having spinel-type crystal structures, $A_2BO_4$.

11. The method of claim 1, wherein the preparation of an activated support tape comprises:
    A. rolling an alloy strip made of Fe-Cr-Al alloy or Ni-Cr-Al alloy into a thin alloy tape;
    B. perforating the resulting thin alloy tape with small holes having burrs;
    C. crimping the resulting tape into a corrugated tape;
    D. subjecting the corrugated tape to degreasing, acid etching, roughening and high temperature oxidation to form a protective film of $\gamma\text{-Al}_2\text{O}_3$ on the surfaces of the tapes.

12. The method of claim 7 wherein said catalyst forming step is carried out prior to the oxidizing step.

13. The method of claim 7 wherein said catalyst forming step is carried out after the oxidizing step.

14. The method of claim 10, wherein the catalyst forming step is carried out prior to the oxidizing step.

15. The method of claim 10, wherein the catalyst forming step is carried out after the oxidizing step.

16. Rare earth metal catalysts with a honeycomb-like alloy support prepared by the method according to claim 1.

17. Rare earth metal catalysts with a honeycomb-like alloy support prepared by the method according to claim 12.

18. Rare earth metal catalysts with a honeycomb-like alloy support prepared by the method according to claim 13.

19. Rare earth metal catalysts with a honeycomb-like alloy support prepared by the method according to claim 14.

20. Rare earth metal catalysts with a honeycomb-like alloy support prepared by the method according to claim 15.

21. The method of claim 7 wherein A is a mixture of light rare earth metals.

22. The method of claim 7 wherein A is lanthanum.

23. The method of claim 10 wherein A is a mixture of light rare earth metals.

24. The method of claim 10 wherein A is lanthanum.

* * * * *